July 17, 1962 C. A. V. SMITH 3,044,645
VEHICLES

Filed Oct. 7, 1958 8 Sheets-Sheet 5

FIG. 5.

INVENTOR
CHARLES AQUILA VINCENT SMITH
BY
*Larson and Taylor*
ATTORNEYS

July 17, 1962 C. A. V. SMITH 3,044,645
VEHICLES
Filed Oct. 7, 1958 8 Sheets-Sheet 6

INVENTOR
CHARLES AQUILA VINCENT SMITH
BY *Larson and Taylor*
ATTORNEYS

July 17, 1962 C. A. V. SMITH 3,044,645
VEHICLES

Filed Oct. 7, 1958 8 Sheets-Sheet 8

FIG. 14.

INVENTOR
CHARLES AQUILA VINCENT SMITH

BY Larson and Taylor

ATTORNEYS

United States Patent Office 3,044,645
Patented July 17, 1962

3,044,645
VEHICLES
Charles Aquila Vincent Smith, 50 Knights Bridge Court, Sloane St., London, England
Filed Oct. 7, 1958, Ser. No. 765,765
Claims priority, application Great Britain Oct. 7, 1957
1 Claim. (Cl. 214—505)

This invention relates to vehicles, and has particular reference to road vehicles. Traffic congestion today is such that large vehicles, particularly passenger vehicles, are undesirable in crowded traffic centres, and it would be convenient if central traffic could be limited to small vehicles.

It is an object of the present invention to enable large vehicles to be so designed as to carry small vehicles within or upon them so that the larger or parent vehicle may be parked on the outskirts of a busy centre and the smaller or dinghy vehicle may then be placed on the road and utilised instead.

According to the present invention there is provided a four-wheeled motor vehicle arranged to carry a normal complement of passengers and having in addition means to house a smaller dinghy vehicle on its roof or in its boot in a stowed position and means to move said dinghy vehicle between the road and said stowed position.

According further to the invention there is provided a four-wheeled motor vehicle having the road wheel drive and rear suspension so arranged that there is an uninterrupted gap between the rear wheels arranged to accommodate a second smaller dinghy vehicle.

Preferably the four-wheeled motor vehicle has independent transmissions to the rear wheels, there being provided pivoted links together forming a V-shaped bracing member to locate the rear wheels.

According also to the present invention, there are provided means for carrying a small road vehicle on the roof of a larger road vehicle having a rack for the reception thereof, comprising a ramp arranged to extend between the rear of the rack and the ground, a carrier for the small vehicle slidably connected with the rear end of the ramp, and means to raise the carrier, loaded with the small vehicle, up the ramp to the rack, the ramp being foldable and arranged for stowage in the boot of the larger vehicle.

Preferred embodiments of the invention will now be particularly described by way of example with reference to the accompanying drawings in which.

Referring to FIGURES 1 to 5 of the drawings, a four-wheeled motor road vehicle 50 is arranged to accommodate a smaller three-wheeled road vehicle 51, hereinafter referred to as the dinghy 51, and comprises a ramp 52 pivoted about a transverse axis 53 (see FIGURE 3) situated on the chassis 54 of the vehicle 50. The ramp 52 is provided at its rear with shoes 55 intended to prevent any movement of the dinghy 51 when in the stowed position, while adjacent to its pivoted end the ramp 52 has a shoe 56 pivotable about an axis 57 also located on the chassis 54. The shoe 56 is urged upwardly by a spring 58.

Figure 3:
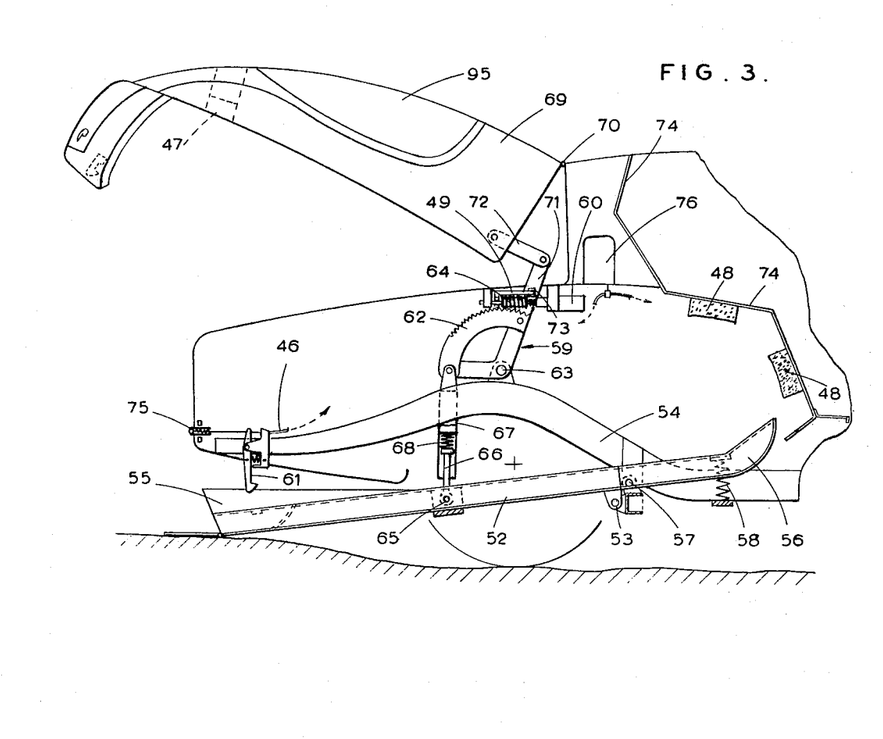
FIGURE 3 is a fragmentary diagrammatic side elevation of the boot, hood, ramp and operating mechanism of the vehicle shown in FIGURE 1, with the ramp and hood in the open position ready to receive a dinghy.
Figure 4:
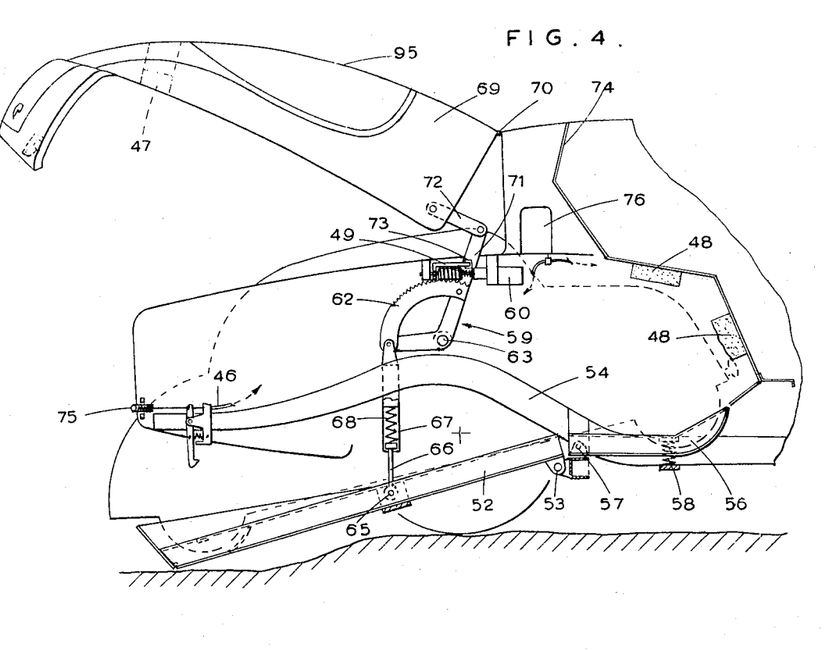
FIGURE 4 is similar to FIGURE 3, but shows the dinghy on the ramp, ready to be stowed.
Figure 5:
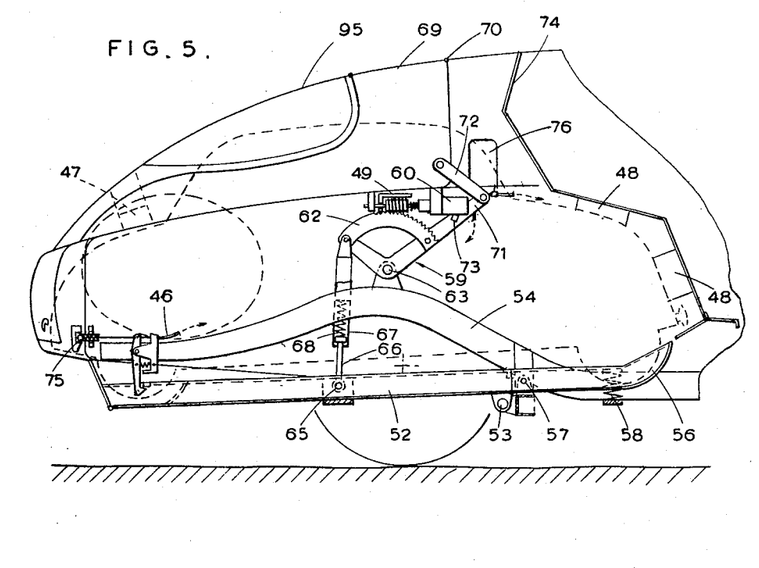
FIGURE 5 is a fragmentary diagrammatic side elevation, of the vehicle according to FIGURE 1, with the stowed dinghy indicated.
Figure 6:
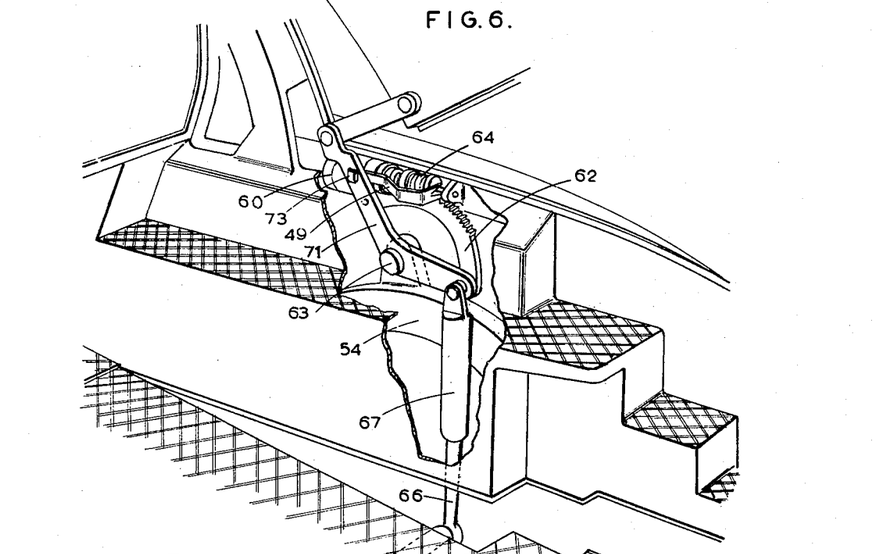
FIGURE 6 is a fragmentary perspective view of the operating linkage for the hood and ramp.

The ramp 52 is controlled by a power-operated linkage 59 driven by an electric motor 60, and is locked in its closed position by a locking catch 61 of known type. The power-operated linkage 59 comprises a sector 62 pivotable about an axis 63 and meshing with a spring-biased worm gear 64 splined on an extension of the spindle of the electric motor 60. One end of the sector 62 is connected to the ramp 52 at 65 by resilient connecting means comprising a rod 66 held in a cylinder 67 by a spring 68.

The same power-operated linkage 59 is used to actuate a hood 69 mounted in alligator fashion on a hinge 70. A hood actuating arm 71 extending from the upper end of the sector 62 is operatively connected with the head 69 by a link 72, so that simultaneous movement of the ramp and hood take place when the linkage is driven by the electric motor 60.

Figure 7:
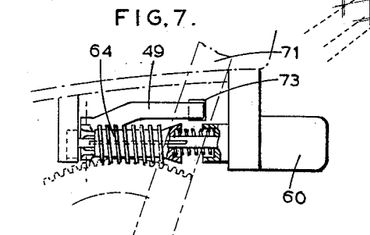
FIGURE 7 is a detail diagrammatic elevation of a device for locking the hood in its open position.
Figure 8:
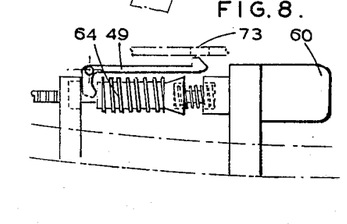
FIGURE 8 is a diagrammatic plan thereof.

Means for locking the hood 69 in the open position comprise a locking arm 49 co-operating with the spring-biased worm gear 64 and an aperture 73 in the arm 71.

Figure 1:
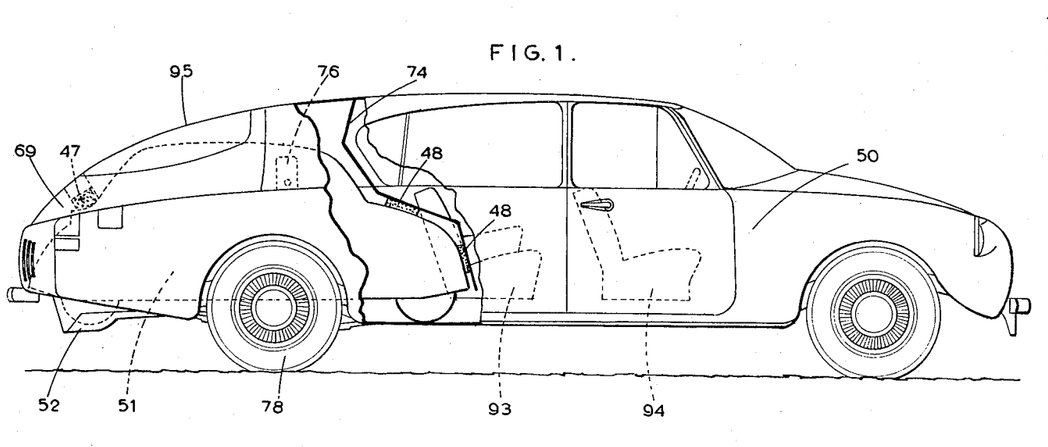
FIGURE 1 is a side elevation, partly broken away, of a vehicle showing a dinghy in the stowed position in broken lines, as well as passenger seats.
Figure 2:
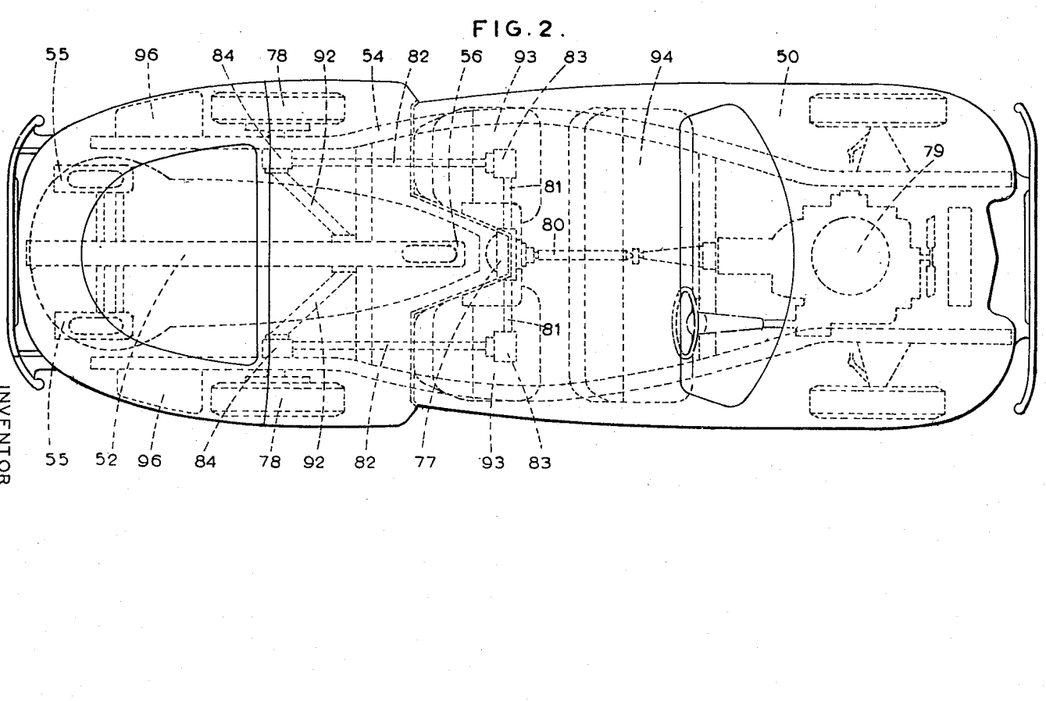
FIGURE 2 is a plan of FIGURE 1 also showing the dinghy, and passenger seats in broken lines.

In the closed position shown in FIGURES 1 to 3 with both the hood 69 and the ramp 52 in place, the dinghy 51 is prevented from moving relatively to the transporting vehicle 50 by buffers 48 made of a suitable resilient material and arranged on an internal separating wall 74 to fit the rear body outline of the dinghy 51 snugly. Other buffers 47 are mounted on the inside of the hood 69 for a similar purpose. The hood 69 is locked in position by a catch 75 arranged to cooperate with the catch 61, and both catches are controllable by a flexible cable 46 from a control panel 76 provided on the outside of the vehicle 50 adjacent to the hood 69 for operation by the user.

Figure 9:
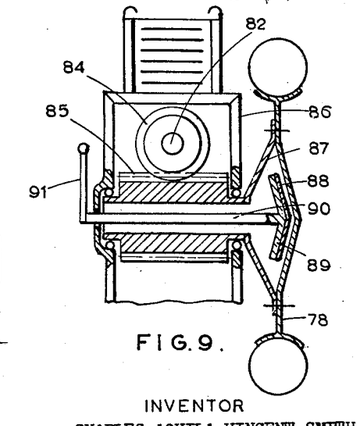
FIGURE 9 is a detail diagrammatic sectional elevation of the driving and braking arrangement for the rear wheels.

The usual differential and transmission found in four-wheeled motor road vehicles is replaced in the present embodiment by a differential 77 (see FIGURE 2) situated well in front of the rear wheels 78 and is connected to the engine 79 of the vehicle by a propeller shaft 80. Power is transmitted from the differential 77 to each rear wheel 78 by means of a countershaft 81 and a cardan shaft 82 by way of a bevel box 83. Referring now to FIGURE 9, each cardan shaft 82 drives a worm 84 meshing with a worm wheel 85 mounted on a hub 87, the whole being contained in a box 86 carried on coil springs. Each wheel 78 comprises a built-in brake drum 88 bolted to the hub 87, while the brake consists of a large lined disc 89 held on the end of a rod 90 passing through the centre of the worm wheel 85. The rod 90 is fixed to a lever 91 actuated by brake rods, and carries a spiral channel co-operating with a boss (not shown) so that as it turns slightly under the action of the brake rods, it pushes the disc 89 against the brake drum 88.

The wheels 78 are positively located by pivoted links 92 (see FIGURE 2) together forming a V-shaped bracing member.

Two passenger seats 93 are provided behind the driving seat 94, the wall 74 providing an arm rest for each of the seats 93.

The hook 69 (see FIGURE 1) is provided with a boot door 95 within it, capable of being opened independently of the larger hood 69, and is not connected to the linkage 59 and other components. Thus, when the larger hood 69 is raised the component necessary for the storage of the dinghy 51 are brought into operation, whereas when the boot is empty and the boot door 95 is raised, these components are left undisturbed and the boot may be used in orthodox manner merely for the accommodation of luggage.

Petrol tanks 96 (see FIGURE 2) are situated at the rear of the vehicle 50, while luggage space and space for a spare wheel are available on both sides of the stowed dinghy 51.

Cushioning means, in the present case in the form of springs, have been provided in the ramps to overcome the problems created by uneven ground.

Figures 10, 11, 12, 13:
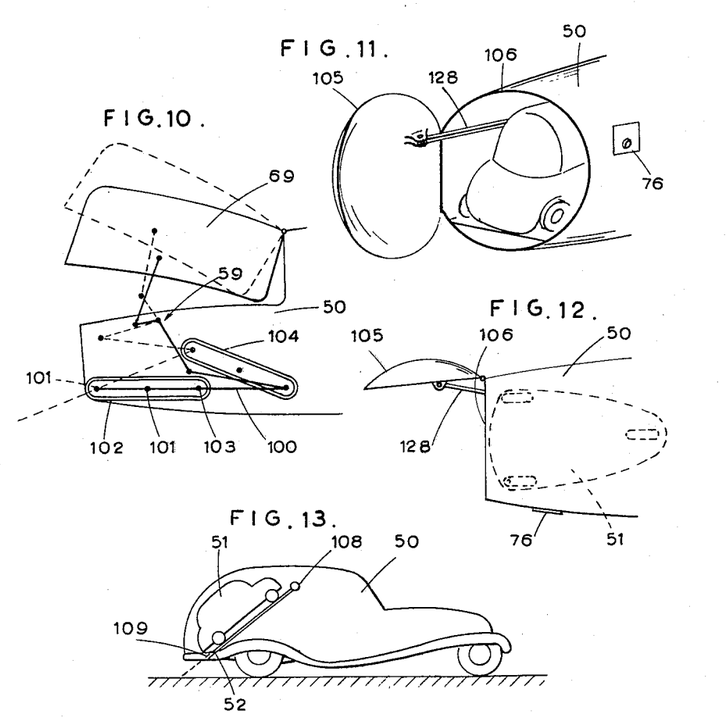
FIGURE 10 is a diagrammatic side elevation of the ramp operating mechanism according to a second embodiment of the invention.
FIGURE 11 is a fragmentary diagrammatic perspective view of another type of boot closure, in the open position.
FIGURE 12 is a plan thereof.
FIGURE 13 is a diagrammatic sectional elevation of another embodiment of the invention.

Referring to FIGURE 10, an alternative ramp-operating mechanism is provided in a motor vehicle as just described. In this embodiment the parent vehicle 50 has a boot with a tiltable floor 100, and a pair of transverse trunnions 101 in the middle of the floor, constrained to run in horizontal fore-and-aft guideways 102 of limited length. A second pair of transverse trunnions 103 located at the front end of the floor 100 is constrained to run in fore-and-aft guideways 104 secured within the body of the parent vehicle 50 so as to slope downwardly and forwardly, the arrangement being such that as the tiltable floor 100 is turned rearwardly by a power operated linkage 59 of the kind described with reference to FIGURES 1 to 9, it is tilted so that its rear edge is lowered and its front edge is raised. The arrangement is shown in almost stowed position in full lines and in the loading position in broken lines.

An alternative construction for closing the boot of the vehicle 50 is shown in FIGURES 11 and 12, the vehicle 50 being in other respects of the same kind as described hereinabove. The boot is closed by a substantially circular domed hinged door 105 abutting against a hoop-shaped frame 106 which is arranged to constitute a load-bearing structural member in the body of the vehicle 50.

This construction of boot door can be used in conjunction with either of the embodiments described above, with suitable modifications.

Another embodiment of the invention is shown in FIGURE 13, in which an ordinary four-wheeled road vehicle 50 is provided with a boot increased in capacity so as to carry a dinghy vehicle 51 inclined to the position shown, thereby taking up less space. A ramp 52 provided with winch means 108 hoists the dinghy 51 and a pallet 109 on which it is mounted into the stowed position for transport. In order to release the dinghy 51, the pallet 109 carrying the dinghy 51 is lowered until it meets the ground and the dinghy 51 clamped thereto is then released and rolled away.

Figure 14:
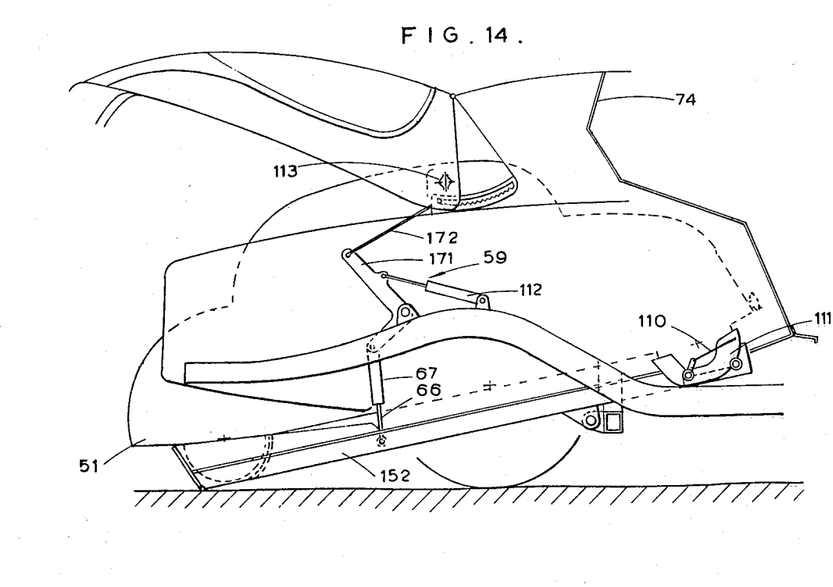
FIGURE 14 is a diagrammatic elevation of the booth of a vehicle according to a further embodiment of the invention, in which a balanced ramp, hydraulic operating gear and cable and trolley means for loading and unloading a dinghy are used.

A further example of a vehicle according to the invention will now be described with reference to FIGURE 14, this embodiment incorporating a balanced ramp 152 extending the whole length of the dinghy 51. A cable 110 and shoe 111 are operatively connected to a winch (not shown), so that the dinghy 51 can be hoisted onto the ramp 52 and held in position thereon to prevent movement in the stowed position. The ramp operating linkage 59 is basically the same as that described in connection with the other embodiments of the invention, but hydraulic means in the form of a hydraulic ram 112 actuate the hood operating links 171, 172 and the ramp linkage 66, 67. A governor of the ratchet and segment type is diagrammatically indicated by the reference numeral 113, and is intended to control operation of the linkage 59.

Figure 15:
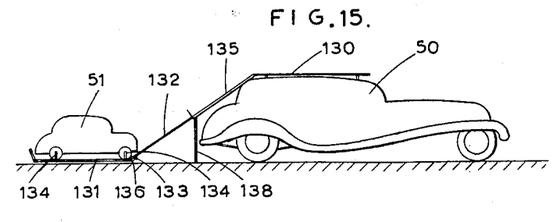
FIGURE 15 is a diagrammatic side elevation of another embodiment of the invention, showing a dinghy in position for stowing on the roof of a parent vehicle.

In yet another embodiment of the invention, a four-wheeled motor vehicle 50 has a rack 130 on its roof for carrying a dinghy motor vehicle 51. Racks for the carriage of large objects are well known, and it is sufficient to say that the roof of the larger vehicle 50 must be sufficiently strong to support the weight of the smaller vehicle 51 and that a rack 130 of generally known type must be provided thereon, with suitable clamping means to retain, e.g., the wheels of the smaller vehicle, or other convenient parts, in safe and rigid condition.

The larger vehicle 50 is provided with a carrier 131 and with a ramp 132 extending between the carrier 131 when it is on the ground and the rear end of the rack 130 on the roof. The carrier 131 consists of a simple framework of flat strip having five pockets 133 or shoes into which the wheels of the smaller vehicle 51 may be fitted. Three of these pockets are in a transverse line at the forward end of the carrier 131, while the other two are in a transverse line at the rear end. If a four-wheeled vehicle is to be carried, then four of the pockets are used, while if a three-wheeled vehicle is to be carried the central pocket of those three which is in line is employed in conjunction with the remaining two at the other end of the carrier. Suitable clamping means 134 are provided associated with the pockets 133 to retain the wheels of the smaller vehicle therein. The carrier 131 is arranged to lie on the ground behind the larger vehicle 50 so that the smaller vehicle 51 may be driven on to or off the carrier 131.

The forward end of the carrier 131 is operatively connected with the rear end of a downwardly sloping ramp 132, the forward end of which is operatively connected with the rear of the rack on the roof of the larger vehicle 50. Conveniently, the ramp constitutes two parallel rails 135, engageable by flanged rollers 136 which are rotatably mounted at the forward end of the carrier about a transverse axis and such rollers 136 may have pinion or ratchet means associated therewith to engage teeth in the ramp to prevent the carrier 131 from moving downwardly when such movement is not desired. Preferably, the rollers have pinion means engageable with rack teeth on the ramp 132 and driven by rollers in contact with the powered road wheels 137 of the smaller vehicle.

The ramp 132, in addition to being operatively connected with the rack 130 and the carrier 131, has intermediate its length a strut 138 located vertically to support it on the ground when the smaller vehicle is being raised up it. The ramp 132 is also foldable, conveniently about the same intermediate point, so that it may be doubled upon itself and the strut 138 may also be hingedly folded against the ramp 132, when the latter is collapsed and the whole assembly may conveniently be mounted on one end of a pivoted linkage, the other end of which is pivotally mounted within the boot of the larger vehicle 50. It will thus be seen that when the ramp 132, and its associated parts are collapsed, they may be folded and stowed within the boot. When they are swung out of the boot they will be unfolded so as to constitute three divergent members, two of which are located so as to lie in the same place and to constitute the ramps 132, and the third of which extends to the ground approximately vertical and constitutes the support 138 for the ramp 132.

In operation, the larger vehicle 50 will be regarded as travelling with the smaller vehicle 51 on the roof. When the larger vehicle 50 is parked, the boot is opened and the ramp assembly 132, 138 is swung out and unfolded so that the ramp 132 extends from the rear of the rack 130 to the ground. A foldable ladder of light alloy, conveniently stowed in the boot, is then erected and the driver enters the smaller vehicle 51 on the hood and unlocks the clamping devices 134 which anchor the smaller vehicle 31 and its carrier 131 to the roof. The driver starts the engine of the smaller vehicle 51 and puts it into gear, thereby driving a roller 136 in contact with the road wheel and causing the carrier 131 to be moved along the rack 130 on to the downwardly sloping ramp 132. For this purpose, in conjunction with or instead of the rack and pinion gear already described, it may be convenient to employ cables running from the front of the rack 130 to the rear of the ramp 132 along which the carrier 131 winds itself. Furthermore, it may be advantageous to curve the rack 130 downwardly at its rear end and to have the ramp 132 of bowed configuration when viewed in side elevation, in order to effect a smooth translation of the carrier from the rack 130 to the ramp 132. By continued movement the carrier 131 is lowered to the ground and the smaller vehicle 51 is then driven off. The carrier 131 is then returned to the roof rack 130, conveniently by utilising a crank handle attachable to a convenient spindle in the driving mechanism and thereby constituting a hand winch. The ramp 132 is then detached from the rack 130 and replaced in the boot.

Instead of the power means described above the raising and lowering means may be entirely hand-operated by a winch employing either cables and rollers or pinions and racks or a combination of both.

I claim:

In a four wheel motor vehicle having a main body portion, a rear compartment adapted to accommodate a smaller vehicle, said compartment having a tiltable floor, means for tilting said floor to lower its rear edge, a cover for said compartment, said cover being hinged to the main body portion, means for raising the rear edge of said cover to a height sufficient to permit entry of the smaller vehicle into said compartment, said means for raising said cover and for tilting said floor being both operatively connected and driven by an electric motor, the said rear compartment being disposed within the motor vehicle to extend forward into the main body and forward of the rear wheels of said motor vehicle with the rear wheels disposed at either side of said rear compartment, and separate drive means for each rear wheel extending forward from said wheels along the side of said tiltable floor.

References Cited in the file of this patent
UNITED STATES PATENTS

| | | |
|---|---|---|
| 2,219,249 | Blagden et al. | Oct. 22, 1940 |
| 2,323,279 | Van Zelm | June 29, 1943 |
| 2,402,283 | Hewitt | June 18, 1946 |
| 2,432,228 | Lano | Dec. 9, 1947 |
| 2,462,868 | Ives | Mar. 1, 1949 |
| 2,541,288 | Rice | Feb. 13, 1951 |
| 2,907,580 | Tietig | Oct. 6, 1959 |